United States Patent Office 3,798,254
Patented Mar. 19, 1974

3,798,254
SUBSTITUTED S-DICHLOROMETHYL ORGANO-THIOSULFONATES AND THEIR MANUFACTURE
Wendell Gary Phillips, Olivette, Mo., assignor to Monsanto Company, St. Louis, Mo.
No Drawing. Filed Sept. 20, 1971, Ser. No. 182,252
Int. Cl. C07c 141/00
U.S. Cl. 260—453 R          8 Claims

ABSTRACT OF THE DISCLOSURE

Substituted S-dichloromethyl organothiosulfonates are prepared from substituted dichloromethane sulfenyl chlorides by reaction with an ionized organosulfinate in the presence of water and an immiscible organic solvent. These compounds are pesticidally active and particularly useful as pre-emergent herbicides.

---

This invention relates to substituted S-dichloromethyl organothiosulfonates of the formula $$E-CCl_2-S-\underset{\underset{O}{\|}}{\overset{\overset{O}{\|}}{S}}-R''$$

and their manufacture from the corresponding substituted dichloromethane sulfenyl chlorides of the formula $$E-CCl_2-S-Cl$$

and an ionized organosulfinate of the formula $$R''SO_2^-M^+$$

wherein E— is $$-C\equiv N,\ -\underset{\underset{O}{\|}}{\overset{\overset{O}{\|}}{S}}-X,\ -\overset{\overset{O}{\|}}{C}-H,\ -\overset{\overset{O}{\|}}{C}-X,\ -\overset{\overset{O}{\|}}{C}-O-Y,\ \text{and}\ -\overset{\overset{O}{\|}}{C}-N\overset{R'}{\underset{R}{\diagdown}}$$

X is phenyl, halophenyl, trihalomethyl phenyl or lower alkyl phenyl, Y is lower alkyl or benzyl, R and R' are each, independently, hydrogen, phenyl, halophenyl, lower alkyl phenyl, lower alkyl, lower alkoxyalkyl, or lower alkoxy or R and R' when taken together are alkylene of the empirical formula $C_nH_{2n}$ wherein $n$ is an integer from 4 through 8, inclusive, and having from 4 through 8 carbons in a continuous chain between the nitrogen terminal valence bonds, R" is phenyl, halophenyl, trihalomethyl phenyl, lower alkyl phenyl, lower alkoxy phenyl, cyanophenyl lower alkyl, halo-substituted lower alkyl, or phenyl-substituted lower alkyl and M is an alkali metal or hydrogen provided that when M is hydrogen and E— is $$-\overset{\overset{O}{\|}}{C}-N\overset{R}{\underset{R'}{\diagdown}}$$

neither R nor R' is hydrogen.

Lower alkyl is alkyl having from 1 to 5 carbons. Examples of lower alkyl include methyl, ethyl, propyl, butyl, and pentyl and the various isomeric forms thereof.

Lower alkoxy have from 1 to 5 carbons. Examples of alkoxy include methoxy, ethoxy, propoxy, butoxy, and pentoxy and the various isomeric forms thereof. Lower alkoxyalkyl have from 2 to 8 carbons. Examples of lower alkoxyalkyl include, but are not limited to, propoxymethyl, butoxybutyl, butoxyethyl, methoxymethyl, ethoxypropyl, and the various isomeric forms thereof.

Halo is a halogen selected from the group consisting of fluorine, chlorine, bromine and iodine.

Examples of the substituted phenyl groups found in compounds of this invention include, but are not limited to, substituted phenyls of the formula -[phenyl]-$Z_m$ wherein Z is halo, trihalomethyl, cyano, lower alkoxy or lower alkyl and $m$ is an integer from 1 through 3, inclusive.

Examples of heterocyclic groups of nitrogen and alkylene of the empirical formula $C_nH_{2n}$ wherein $n$ is an integer from 4 through 8, inclusive, and having from 4 through 8 carbons in a continuous chain between the nitrogen terminal valence bonds include but are not limited to pyrrolidinyl, piperidinyl, hexamethyleneimino, heptamethyleneimino, octamethyleneimino, 2-ethylpyrrolidinyl, 3-butylpyrrolidinyl, 2,5-dimethylpyrrolidinyl, 2,5-diethylpyrrolidinyl, 3,4-dimethylpyrrolidinyl, 2-pipecolinyl, 3-pipecolinyl, 4-pipecolinyl, 2,6-dimethylpiperidinyl, 2-ethyl-6-methylpiperidinyl, 2-propylpiperidinyl, 3-methylhexamethyleneimino, 3,4-dimethylhexamethyleneimino, and the various isomeric forms thereof.

Alkali metals are metals of Group I of the Periodic Table. Preferred alkali metals are lithium, sodium and potassium, more preferred is sodium.

The compounds of this invention are conveniently and efficiently prepared by the reaction, in the presence of water and an immiscible organic solvent, of about equimolecular proportions of a substituted dichloromethane sulfenyl chloride of the formula $$E-CCl_2-S-Cl$$

and an ionized organosulfinate of the formula $$R''SO_2^-M^+$$

wherein E and R" have the aforementioned significance and M is an alkali metal. The reaction is postulated to proceed as follows:

$$ECCl_2SCl\ +\ R''SO_2^-M^+\ \longrightarrow\ ECCl_2S-\underset{\underset{O}{\|}}{\overset{\overset{O}{\|}}{S}}-R''\ +\ M^+Cl^-$$

When M is hydrogen the reaction mass must additionally contain an HCl scavenger. The HCl scavenger must be present in at least an equimolecular amount as compared to the substituted sulfenyl chloride. Generally not more than twice the equimolecular amount of scavenger is useful although the maximum amount is not critical. The type of scavenger is not critical to the invention so long as it does not interfere with the reaction of the ionized organosulfinate and the substituted sulfenyl chloride. Preferred scavengers are trialkyl amines. More preferred trialkyl amines have from 2 through 5 carbons in the alkyl group.

The reaction mass is a two phase system, an aqueous or water phase and an organic solvent phase. Examples of organic solvents, i.e., common organic liquids which are immiscible with water and inert under the reaction conditions and which dissolve the sulfenyl chloride and the desired product of the reaction, include, but are not limited to, aliphatic hydrocarbons, such as pentane, hexane, mineral spirits, etc., aromatics such as benzene, toluene, xylenes, etc., ethers such as diethyl ether, diisopropyl ether, petroleum ether, etc., esters such as methyl acetate, ethyl acetate, propyl acetate, etc., and other inert organics which are solvents for the sulfenyl chloride. The ionized organosulfinate and the chloride salt by-product are generally not soluble in the above organic solvents. Accordingly, the reaction between the sulfenyl chloride and the ionized organosulfinate takes place at the interface of the two phase system.

Although the reaction can proceed without agitation, agitation of the reaction mass facilitates the reaction by providing intimate association of the two phases. Thus, agitation of the reaction mass is preferred in the method of this invention.

It is likewise preferred to have the ionized organosulfinate present in excess of one molecular proportion of sulfenyl chloride in order to minimize reaction time. It is more preferred to have the ionized organosulfinate present in an excess in the amount of from about 3 to about 10 molecular proportions per molecular proportion of sulfenyl chloride.

The reaction is normally carried out at a temperature above the freezing point of the system but preferably not above its boiling point. Still more preferably, the reaction is carried out at temperatures of from room temperature, about 23 degrees centigrade (° C.), to about its boiling point. The reaction is most conveniently carried out under reflux conditions with rapid agitation. The reaction is usually carried out at atmospheric pressure, but higher or lower pressures may be utilized if equipment and other factors favor such higher or lower pressures. The reaction may be carried out in an open vessel as well as under reflux.

Substituted S-dichloromethyl organothiosulfonates of this invention are useful as biocides. Exemplary of such biocidal uses for these products is the control of nematodes, arachnids, arthropods and insects as well as eradication of noxious weeds. These compounds are particularly useful as pre-emergent and contact herbicides.

Pre-emergent and contact herbicidal compounds are useful in the selective killing of weeds in crops. In using the compounds of the present invention as pre-emergent and contact herbicides, the compounds can be used alone or in combination with a material referred to in the art as an adjuvant in liquid or solid form. Herbicidal formulations are prepared by admixing the compound which is the active ingredient of the formulation with an adjuvant including diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid of organic origin, water, a wetting agent, dispersing agent, an emusifying agent or any suitable combination of these. The herbicidal formulations usually contain from about 0.01 percent to about 99 percent by weight of the active ingredient. Application of these formulations to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface soil or to above ground portions of plants can be carried out by conventional methods, e.g. power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment, the active ingredients are applied in amounts from about 1 to about 50 or more pounds per acre. In applications to soil for the control of the growth of germinant seeds, germinative seeds, emerging seedlings and established vegetation, the active ingredients are applied in amounts from about 0.1 to about 25 or more pounds per acre. It is believed that one skilled in the art can readily determine from the teachings of this specification the general procedure for any application.

Manufacture of substituted dichloromethane sulfenyl chlorides, used as starting materials in the preparation of the compounds of the present invention, is taught in my prior U.S. patent application Ser. Nos. 139,976 and 139,-978, filed May 3, 1971, and each entitled, "Substituted Alpha, Alpha-Dichloro-Methane Sulfenyl Chlorides and Their Manufacture."

Ionized organosulfinates used in the preparation of the compounds of the present invention are either known compounds or may be prepared by prior art methods from known compounds.

As illustrative of this invention, but not limitative thereof, is the following:

EXAMPLE 1

To a suitable reaction vessel equipped with an agitator is charged approximately 100 milliliters (ml.) of water. Approximately 8.9 grams (g.), about 0.05 mole, of sodium paratoluenesulfinate is then dissolved in the water. Approximately 15.6 g., about 0.05 mole, of 2-(chlorothio)-2,2-dichloro-N-isopropylacetanilide are dissolved in about 100 ml. of carbon tetrachloride and then added to the reaction mass. The mass is stirred vigorously overnight at ambient room temperature. The layers are separated and the carbon tetrachloride is removed by vacuum distillation from the organic layer, leaving an oily residue. Having determined that the reaction is incomplete, an additional 20 g., about 0.1 mole, of sodium paratoluenesulfinate is dissolved in about 100 ml. of water and added to the residue along with about 100 ml. of carbon tetrachloride. The mass is heated to boiling and maintained at this temperature with stirring for about 1 hour. Thereafter the mass is cooled to room temperature and the layers are separated. The carbon tetrachloride is removed by vacuum distillation leaving a white solid residue. The solid is found to be soluble in acetone and ether, to be insoluble in water, and to have a melting point of about 98 to 100° C. and is identified by nuclear magnetic resonance as S - dichloro(isopropylphenylcarbamoyl) methyl para-toluenethiosulfonate

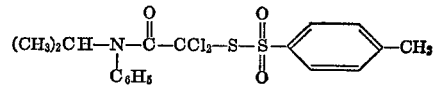

Calculated for $C_{18}H_{19}Cl_2NO_3S_2$ (percent): C, 50.00; H, 4.43. Found (percent): C, 50.05; H, 4.59.

EXAMPLE 2

To a suitable reaction vessel equipped with an agitator is charged about 100 ml. of water. Approximately 20 g. of sodium benzenesulfinate is then dissolved in the water. Approximately 10 g. of 2-(chlorothio)-2,2-dichloro-N-isopropylacetanilide is dissolved in about 100 ml. of carbon tetrachloride and then added to the reaction mass. The mass is stirred vigorously overnight at ambient room temperature. The mass is then heated to its boiling point and maintained at this temperature for about ½ hour with vigorous stirring to insure a complete reaction. Thereafter the mass is cooled to room temperature and the layers are separated. The carbon tetrachloride is then removed by vacuum distillation. An oil remains which, upon scratching the interior surface of the vessel, forms a solid. The solid is washed with about 100 ml. of petroleum ether, is found to be soluble in acetone and ethanol, to be insoluble in water, and to have a melting point of about 86 to 90° C, and is identified by nuclear magnetic resonance as S-dichloro(isopropylphenylcarbamoyl)methyl benzenethiosulfonate

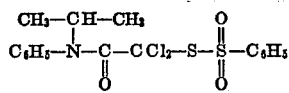

EXAMPLES 3 THROUGH 32

The procedure of Example 2 is followed except that, in place of about 10 g. 2-(chlorothio)-2,2-dichloro N-isopropylacetanilide, an approximately equimolecular amount of the compound of Column A is charged and the product of Column B is obtained:

| Example | A | B |
|---|---|---|
| 3 | $(C_6H_5)_2N-\overset{O}{\underset{}{C}}-CCl_2-S-Cl$ | $(C_6H_5)_2N-\overset{O}{\underset{}{C}}-C-CCl_2-\overset{O}{\underset{O}{S}}-S-C_6H_5$ |
| 4 | $(CH_3)_2CH-N-\overset{O}{\underset{}{C}}-CCl_2-S-Cl$ with Cl-C_6H_3-Cl | $(CH_3)_2CH-N-\overset{O}{\underset{}{C}}-CCl_2-\overset{O}{\underset{O}{S}}-C_6H_5$ with Cl-C_6H_3-Cl |
| 5 | $C_6H_5-\overset{O}{\underset{O}{S}}-CCl_2-S-Cl$ | $C_6H_5-\overset{O}{\underset{O}{S}}-CCl_2-S-\overset{O}{\underset{O}{S}}-C_6H_5$ |
| 6 | $C_2H_5-C_6H_3-C_2H_5$; $CH_3OCH_2-N-\overset{O}{\underset{}{C}}-CCl_2-S-Cl$ | $C_2H_5-C_6H_3-C_2H_5$; $CH_3OCH_2-N-\overset{O}{\underset{}{C}}-CCl_2-\overset{O}{\underset{O}{S}}-C_6H_5$ |
| 7 | $(CH_3O)_2N-\overset{O}{\underset{}{C}}-CCl_2-S-Cl$ | $(CH_3O)_2N-\overset{O}{\underset{}{C}}-CCl_2-\overset{O}{\underset{O}{S}}-C_6H_5$ |
| 8 | $[CH_3(CH_2)_4O]_2N-\overset{O}{\underset{}{C}}-CCl_2-S-Cl$ | $[CH_3(CH_2)_4O]_2N-\overset{O}{\underset{}{C}}-CCl_2-S-\overset{O}{\underset{C_6H_5}{S}}=O$ |
| 9 | $(CH_3)_2CHO-N-\overset{O}{\underset{}{C}}-CCl_2-S-Cl$; $C_2H_5O$ | $(CH_3)_2CHO-N-\overset{O}{\underset{}{C}}-CCl_2-S-\overset{O}{\underset{O}{S}}-C_6H_5$; $C_2H_5O$ |
| 10 | $C_6H_5-N-\overset{H\ O}{\underset{}{C}}-CCl_2-S-Cl$ | $C_6H_5-N-\overset{H\ O}{\underset{}{C}}-CCl_2-S-\overset{O}{\underset{O}{S}}-C_6H_5$ |
| 11 | $C_2H_5CCH_2CH_2CH_3$; $N-C-CCl_2-S-Cl$; $CH_3O$ $O$ | $C_2H_5OCH_2CH_2CH_3$; $N-C-CCl_2-S$; $CH_3O$ $O$ $O=S=O$; $C_6H_5$ |
| 12 | I-C_6H_4-N-$\overset{O}{\underset{}{C}}$-CCl_2-S-Cl ; I-C_6H_4 | I-C_6H_4-N-$\overset{O}{\underset{}{C}}$-CCl_2-$\overset{O}{\underset{O}{S}}$-C_6H_5 ; I-C_6H_4 |
| 13 | CH_3-C_6H_4-N-$\overset{O}{\underset{}{C}}$-CCl_2-S-Cl ; $(CH_3)_2CHO(CH_2)_4$ | CH_3-C_6H_4-N-$\overset{O}{\underset{}{C}}$-CCl_2-$\overset{O}{\underset{O}{S}}$-C_6H_5 ; $(CH_3)_2CHO(CH_2)_4$ |
| 14 | $N\equiv C-CCl_2-S-Cl$ | $N\equiv C-CCl_2-\overset{O}{\underset{O}{S}}-C_6H_5$ |

TABLE—Continued

| Example | A | B |
|---|---|---|
| 15 | Br-C₆H₄-SO₂-CCl₂-S-Cl | Br-C₆H₄-SO₂-CCl₂-S-SO₂-C₆H₅ |
| 16 | 2,6-(CH₃)₂C₆H₃-SO₂-CCl₂-S-Cl | 2,6-(CH₃)₂C₆H₃-SO₂-CCl₂-S-SO₂-C₆H₅ |
| 17 | (CF₃)C₆H₄-SO₂-CCl₂-S-Cl | (CF₃)C₆H₄-SO₂-CCl₂-S-SO₂-C₆H₅ |
| 18 | 3,4,5-Cl₃C₆H₂-CO-CCl₂-S-Cl | 3,4,5-Cl₃C₆H₂-CO-CCl₂-S-SO₂-C₆H₅ |
| 19 | C₆H₅-CO-CCl₂-S-Cl | C₆H₅-CO-CCl₂-S-SO₂-C₆H₅ |
| 20 | (CF₃)C₆H₄-CO-CCl₂-S-Cl | (CF₃)C₆H₄-CO-CCl₂-S-SO₂-C₆H₅ |
| 21 | C₂H₅-C₆H₄-CO-CCl₂-S-Cl | C₂H₅-C₆H₄-CO-CCl₂-S-SO₂-C₆H₅ |
| 22 | 2,6-(iPr)₂C₆H₃-CO-CCl₂-S-Cl | 2,6-(iPr)₂C₆H₃-CO-CCl₂-S-SO₂-C₆H₅ |
| 23 | C₂H₅-O-CO-CCl₂-S-Cl | C₂H₅-O-CO-CCl₂-S-SO₂-C₆H₅ |
| 24 | (CH₃)₂CHCH₂-O-CO-CCl₂-S-Cl | (CH₃)₂CHCH₂-O-CO-CCl₂-S-SO₂-C₆H₅ |
| 25 | C₆H₅CH₂-O-CO-CCl₂-S-Cl | C₆H₅CH₂-O-CO-CCl₂-S-SO₂-C₆H₅ |
| 26 | CH₃-O-CO-CCl₂-S-Cl | CH₃-O-CO-CCl₂-S-SO₂-C₆H₅ |
| 27 | (CH₂)₄N-CO-CCl₂-S-Cl | (CH₂)₄N-CO-CCl₂-S-SO₂-C₆H₅ |
| 28 | (CH₂)₅N-CO-CCl₂-S-Cl | (CH₂)₅N-CO-CCl₂-S-SO₂-C₆H₅ |
| 29 | (iBu)₂N-CO-CCl₂-S-Cl | (iBu)₂N-CO-CCl₂-S-SO₂-C₆H₅ |
| 30 | (C₂H₅OCH₂)₂N-CO-CCl₂-S-Cl | (C₂H₅OCH₂)₂N-CO-CCl₂-S-SO₂-C₆H₅ |

TABLE—Continued

| Example | A | B |
|---|---|---|
| 31 | [structure: phenyl with CCl₃ substituent, N(H)—C(=O)—CCl₂—S—Cl] | [structure: phenyl with CCl₃ substituent, N(H)—C(=O)—CCl₂—S—S(=O)₂—C₆H₅] |
| 32 | H—C(=O)—CCl₂—S—Cl | H—C(=O)—CCl₂—S(=O)₂—C₆H₅ |

EXAMPLES 33 THROUGH 38

The procedure of Example 2 is followed except that, in place of about 20 g. of sodium benzenesulfinate, an approximately equimolecular amount of the compound of Column A is charged and the production of Column B is obtained.

Calculated for $C_{18}H_{17}Cl_4NO_3S_2$ (percent): C, 43.13; H, 3.42; N, 2.79. Found (percent): C, 43.35; H, 3.51; N, 2.72.

EXAMPLES 40 AND 41

The procedure of Example 2 is followed except that in place of sodium benzenesulfinate an equimolecular

| Example | A | B |
|---|---|---|
| 33 | $C_2H_5SO_2^-Li^+$ | $C_6H_5$—N(CH(CH_3)_2)—C(=O)—CCl_2—S—S(=O)_2—$C_2H_5$ |
| 34 | $C_6H_5CH_2SO_2^-K^+$ | $C_6H_5$—N(CH(CH_3)_2)—C(=O)—CCl_2—S—S(=O)_2—$CH_2C_6H_5$ |
| 35 | Cl—C₆H₄—$SO_2^-Na^+$ | $C_6H_5$—N(CH(CH_3)_2)—C(=O)—CCl_2—S—S(=O)_2—C₆H₄—Cl |
| 36 | 2,6-(CH₃)₂-C₆H₃—$SO_2^-Na^+$ | $C_6H_5$—N(CH(CH_3)_2)—C(=O)—CCl_2—S—S(=O)_2—C₆H₃(CH₃)₂ |
| 37 | $CF_3SO_2^-Na^+$ | $C_6H_5$—N(CH(CH_3)_2)—C(=O)—CCl_2—S—S(=O)_2—$CF_3$ |
| 38 | $(CH_3)_3CCH_2SO_2^-Na^+$ | $C_6H_5$—N(CH(CH_3)_2)—C(=O)—CCl_2—S—S(=O)_2—$CH_2C(CH_3)_3$ |

EXAMPLE 39

To a suitable reaction vessel equipped with an agitator is charged approximately 100 ml. of carbon tetrachloride. Approximately 3.8 g., about 0.01 mole, of 2-(chlorothio)-2,2,3′,4′-tetrachloro-N-isopropylacetanilide are dissolved in the carbon tetrachloride. Approximately 10 g. and excess, of sodium para-toluenesulfinate is then dissolved in 100 ml. of water and then added to the reaction mass. The mass is stirred vigorously overnight at ambient room temperature. The layers are separated and the carbon tetrachloride is removed by vacuum distillation from the organic layer, leaving an oily residue. The residue solidifies upon cooling to room temperature and, upon washing with petroleum ether, a white solid residue remains. The solid is found to be soluble in acetone and ether, to be insoluble in water, and to have a melting point of about 136 to 138° C. and is identified by nuclear-magnetic resonance as S - dichloro[(3,4-dichlorophenyl)isopropylcarbamoyl]methyl paratoluenethiosulfonate

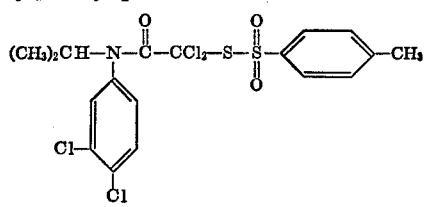

amount of benzenesulfinic acid is added and, in addition, about 0.03 moles of the specified trialkyl amine is added immediately after the sulfenyl chloride. The product of Example 2 is obtained.

Example 40.—Triethyl amino.
Example 41.—Tributyl amine.

EXAMPLE 42

Contact herbicidal activity of representative substituted S-dichloromethyl organothiosulfonates of this invention is determined by the following procedure:

The compound to be tested is applied in spray form to plants of a given age of several grasses and broadleaf species. After the plants are the desired age, each aluminum pan is sprayed with a given volume of a 0.2% concentration solution of the candidate chemical, corresponding to a rate of approximately 3.6 lbs. per acre. This solution is prepared from an aliquot of a 2% solution of the candidate compound in acetone, a known amount of cyclohexanone-emulsifying agent mix, and sufficient water to make up to volume. The emulsifying agent is a mixture comprising 35 wt. percent of a tall oil ethylene oxide condensate having about 6 moles of ethylene oxide per mole of tall oil. The injuries to the plants are then observed approximately 14 days later and the results are recorded.

Contact herbicidal activity of the compound prepared in Example 2 is observed against velvet leaf and quack grass.

EXAMPLE 43

Pre-emergent herbicidal activity of representative substituted S-dichloromethyl organothiosulfonates of this invention is determined by the following procedure:

A good grade of top soil is placed in aluminum pans and compacted to a depth of ⅜ to ½ inch from the top of the pan. A pre-determined number of seeds of each of several plant species are placed on top of the soil in the pans. The seeds are covered with soil and the pans leveled. The herbicidal composition is applied by spraying the surface of the top layer of soil with a solution containing a sufficient amount of active ingredient to obtain a rate of application of 5 lbs. per acre. The pans are then placed on a sand bench in the greenhouse and watered from below as needed. The plants are observed at the end of approximately 14 days and the results recorded.

Pre-emergent activity of the compound prepared in Example 1 is observed again Canada thistle and lambsquarter. Pre-emergent activity of the compound prepared in Example 2 is observed against nutsedge.

While this invention has been described with respect to certain embodiments it is to be understood that it is not so limited and that variations and modifications thereof obvious to those skilled in the art to which this invention appertains can be made without departing from the spirit or scope thereof.

What is claimed is:

1. A compound of the formula

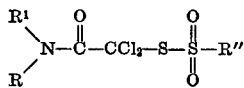

wherein R and R¹ are each lower alkyl and R″ is phenyl, halophenyl, trihalomethyl phenyl, lower alkyl phenyl, lower alkoxy phenyl, lower alkyl, halo-substituted lower alkyl, or phenyl-substituted lower alkyl.

2. A compound of claim 1 wherein R″ is phenyl, halophenyl, trihalomethyl phenyl, lower alkyl phenyl or lower alkoxy phenyl.

3. A compound of the formula

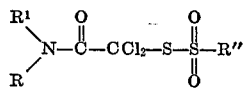

wherein R¹ is phenyl, halophenyl or trihalomethyl phenyl, R″ is phenyl, halophenyl, trihalomethyl phenyl, lower alkyl phenyl, lower alkoxy phenyl, lower alkyl, halo-substituted lower alkyl, or phenyl-substituted lower alkyl and R is lower alkyl.

4. A compound of claim 3 wherein R″ is phenyl, halophenyl, trihalomethyl phenyl, lower alkyl phenyl or lower alkoxy phenyl.

5. A compound of claim 4 wherein R′ is phenyl and R is isopropyl.

6. The compound of claim 5 wherein R″ is phenyl.

7. A compound of claim 5 wherein R″ is halophenyl.

8. The compound of claim 5 wherein R″ is parachlorophenyl.

References Cited

UNITED STATES PATENTS

| | | | |
|---|---|---|---|
| 3,399,988 | 9/1968 | Soong et al. | 71—103 |
| 3,410,898 | 11/1968 | Speziale et al. | 71—118 |
| 2,863,752 | 12/1958 | Hamm et al. | 71—118 |
| 3,337,599 | 8/1967 | Dunbar | 71—103 |
| 3,404,172 | 10/1968 | Tomalia | 260—454 |

OTHER REFERENCES

Yagupol'skii et al., "α,α-Dichloro- and α,α-difluoro-S-aryl, etc." (1967), CA 68 No. 12649k (1968).

Kharasch, "Organic Sulfur Compounds" (1961), Pergamon Press, vol. 1, p. 359 (1961).

Tulecki et al., "Mech. of Ion-Exchange and Add'n. Reactive, etc." (1967), CA 68 No. 53266f (1967).

GLENNON H. HOLLRAH, Primary Examiner

U.S. Cl. X.R.

260—239 BF, 293.73, 293.75, 293.77, 293.85, 293.88, 326.82, 465 D, 465 G, 543 H; 71—88, 94, 95, 103; 424—244, 267, 274, 303